United States Patent [19]

Glimpel

[11] Patent Number: 5,112,168
[45] Date of Patent: May 12, 1992

[54] TAP WITH TAPERED THREAD

[75] Inventor: Helmut Glimpel, Lauf a.d. Pegnitz, Fed. Rep. of Germany

[73] Assignee: Emuge-Werk Richard Glimpel Fabrik für Präzisionswerkzeuge Vormals Moschkau & Glimpel, Lauf/Pegnitz, Fed. Rep. of Germany

[21] Appl. No.: 750,754

[22] Filed: Aug. 22, 1991

Related U.S. Application Data

[63] Continuation of Ser. No. 638,626, Jan. 8, 1991, abandoned.

[30] Foreign Application Priority Data

Jan. 19, 1990 [DE] Fed. Rep. of Germany ....... 4001483

[51] Int. Cl.$^5$ ............................................. B23G 5/06
[52] U.S. Cl. .................................. 408/220; 10/141 R; 408/222
[58] Field of Search ............................... 408/215-222; 10/141 R

[56] References Cited

FOREIGN PATENT DOCUMENTS 682423 10/1939 Fed. Rep. of Germany .... 10/141 R
415691 10/1910 France ............................... 10/141 R

*Primary Examiner*—Steven C. Bishop
*Attorney, Agent, or Firm*—Toren, McGeady & Associates

[57] ABSTRACT

There is a tap having a tapered threaded portion 2 whose thread teeth 4 located in the tapered section are provided with a relief arranged at a clearance angle. It is desirable that the cutting moment and friction should decrease to the back towards the greater diameter. This is achieved in that the clearance angle of the thread teeth 4 in the tapered section 2 remains constant or increases towards the back. A simple machining measure permits the cutting moment and friction to be variably controlled over a wide range.

2 Claims, 1 Drawing Sheet

TAP WITH TAPERED THREAD

This is a continuation of application Ser. No. 07/638,626, filed Jan. 8, 1991, now abandoned.

BACKGROUND OF THE INVENTION

The invention relates to a tap having a tapered thread portion whose thread teeth located in the tapered section are provided with a relief arranged at a clearance angle.

On a tapered thread portion of a tap the width of the teeth looking in the helical direction of the thread, is known to increase so that when a thread is produced, the wider teeth at the back cause much greater friction than the less wide teeth at the front. The cutting moment increases towards the back, i.e. towards the larger diameter. In order to counter this negative phenomenon, the threads in the tapered section are provided with a relief with which is associated a clearance angle. In the prior art, the grinding wheel producing the relief performs the same feed for each tooth and, consequently, produces relief cuts whose clearance angle reduces or decreases towards the larger diameters. As a result, the remedial effect of the "clearance angle" decreases as the diameter increases and, consequently, as the cutting moment increases. In order to decrease the cutting moment and friction towards the back-end larger diameters, some teeth are omitted towards the back. In consequence of this, each remaining tooth has to remove more metal and larger marks tend to occur in the cut thread. It might be possible to keep the tooth width constant towards the back which would involve exceptionally high production costs.

SUMMARY OF THE INVENTION

It is an object of the present invention to provide a tap of the type initially referred to whose cutting moment and friction decrease towards the back-end larger diameter. In achieving this object, the tap according to the invention is characterized in that the clearance angle of the thread teeth located in the tapered section remains constant or increases towards the back.

A simple machining measure enables the cutting moment and the friction to be variably controlled over a wide range. Thanks to the configuration of the relief clearance angle according to the invention, it is possible to meet and match up the requirements in respect to avoiding incorrect tapping and avoiding friction-generated cold welding in an improved manner. The configuration of the clearance angle disclosed permits improved compromises between an improvement of cutting properties, still acceptable guiding properties and the increasing cutting moment towards the back.

The term "tap with tapered thread portion" as used in this description means primarily a tap with a tapered thread. The term "relief" includes not only the flank relief but also the profile relief where the thread teeth are relieved on the sides and on the outside. The tap may, for instance, be fluted in a suitable manner or may be a tap without flutes, i.e. a grooving tap where the tooth is determined by the profiling. The amount of relief may be expressed also by the "feed" instead of by the clearance angle. The term "feed" or "relief size" means the amount of metal removed by relief grinding which is determinable at a pre-determined distance from the start of the relieved region or the material removal and which is the same for all thread teeth.

There are cases where the tooth width remains the same in the direction towards the larger diameter. In this respect, it is a special advantage of the invention that the tooth width increases in the direction towards the greater diameter in as much as the resultant increase in the cutting moment can be compensated for to a certain extent. There are cases where some teeth are omitted in the direction towards the greater diameter. In this respect, it is a special advantage of the invention that the tap is provided with a full complement of teeth because this enables the resulting increasing cutting moment in the direction towards the greater diameter to be compensated for to a certain extent.

It is conceivable to provide the configuration of the clearance angle according to the invention only over part of the length of the tapered section which is provided with relief over the total length. It is specially desirable and advantageous, however, to have the constancy and increase in the relief clearance angle extend over the total length of the tapered section. This will afford full utilization of the advantages of the clearance angle configuration according to the invention and production of the thread of the tap will be simplified.

The increase in clearance angle is either steady or in steps, two or more thread courses per step having the same "feed". Stepwise variation in terms of this invention means that two or more steps are provided. The rate of increase in clearance angle is matched to the material to be tapped and the type of machine in which the tap is to be used. State-of-the-art NC-machine tools used for the manufacture of the tap permit finely controlled constancy or increase in clearance angle, for instance, by changing the position of the grinding wheel producing the relief during the machining of the tap.

BRIEF DESCRIPTION OF THE DRAWINGS

Preferred embodiments of the invention are illustrated in the accompanying drawing in which.

DETAILED DESCRIPTION OF THE PREFERRED EMBODIMENTS

Figure 1:
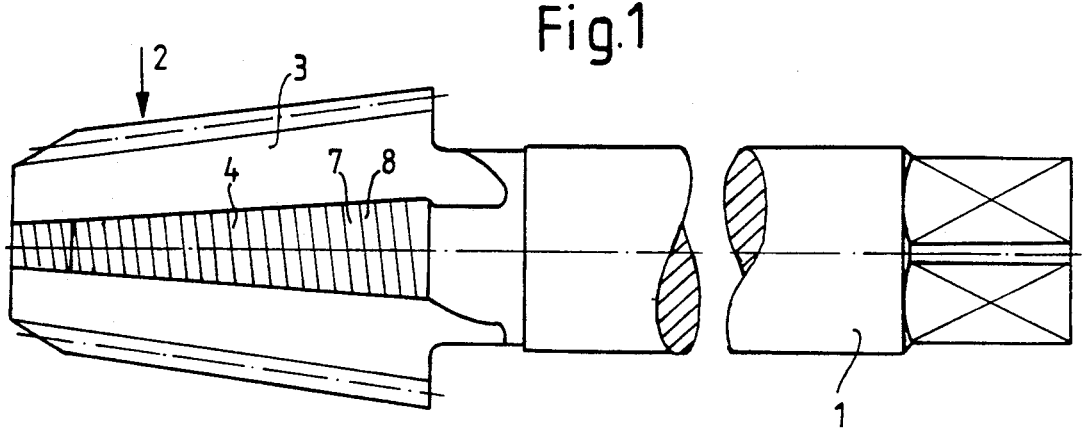
FIG. 1 is a side elevation of a first tap with a tapered thread.

Referring to the drawing, the tap in FIG. 1 is formed on its shank 1 with a substantially truncated thread portion 2 which, apart from the front end which has a smaller diameter is stepless over its length and has a steadily increasing pitch or effective diameter. The threaded portion 2 is provided with flutes 3 which subdivide the thread courses into thread teeth 4. The thread teeth are of increasing width from the front to the back. The threaded portion 2 is provided with a relief 5 over its full length which is provided as a profile relief both on the flanks 6 and the outside 7 on the thread teeth 4.

Figure 2:
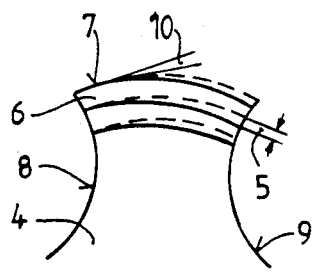
FIGS. 2 and 3 are each a schematic side elevation of a thread tooth with relief.
Figure 3:
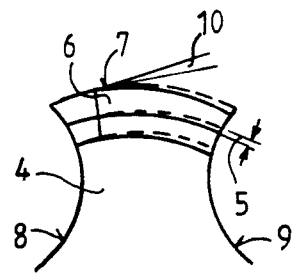

FIGS. 2 and 3 show two different configurations of the relief 5 which is constituted by metal removal which increases in the direction from the tooth front 8 towards the tooth back 9 and which decreases the cross-sectional area of the tooth. While the relief 5 in FIG. 2 starts at the front of the tooth, it starts at a distance from the tooth front 8 in FIG. 3. The relief provides a clearance angle 10 between the relief surface and the imaginary surface existing prior to the relief grinding and, at the back of the tooth has a "feed" corresponding to the metal removal. The surface existing prior to the relief grinding has 0° clearance angle.

Figure 4:
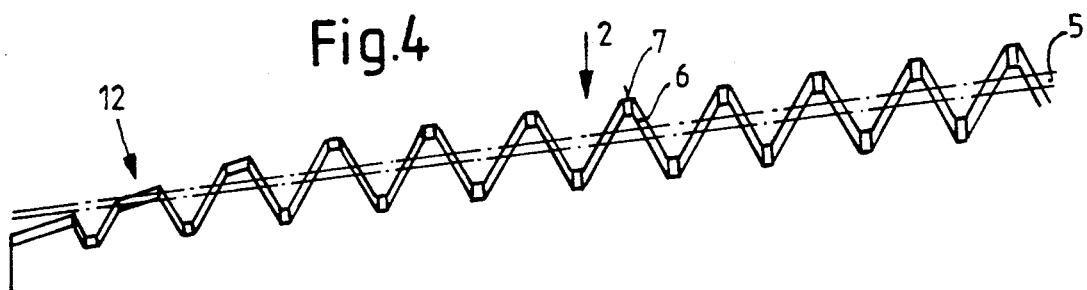
FIG. 4 is a schematic representation of several thread teeth of the tap shown in FIG. 1 and, FIG. 5 is a section through part of a second tap with a tapered thread.
Figure 5:
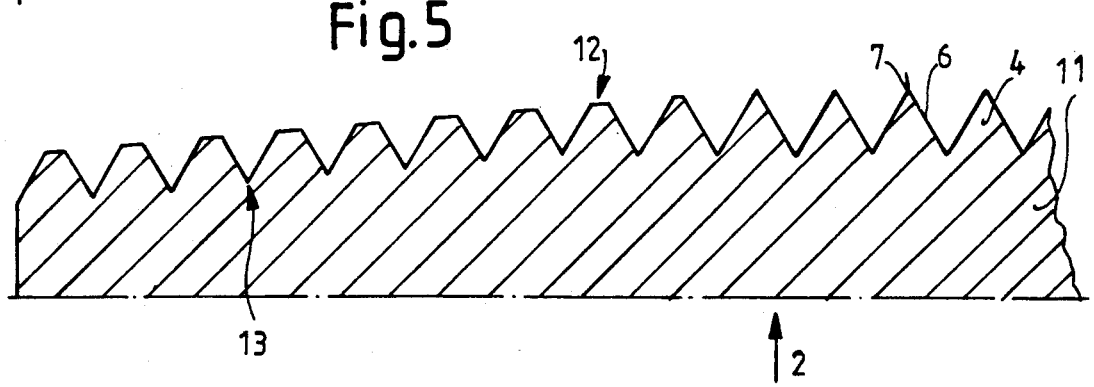

FIG. 4 illustrates the relief which increases towards the back in the clearance angle. In FIG. 1 the total length of the thread of a taper-thread tap is tapered. In FIG. 5, a generally cylindrical tap is provided with a threaded portion 2 which comprises a cylindrical guiding section 11 and a cutting section 12. The cutting section 12 is provided with a chamber 13 which terminates at a distance form the end of the cutting section and represents a tapered thread. The chamfer may also extend as far as the guiding section 11. A relief is provided over the chamfer in a manner not shown in detail and whose clearance angle increases from the front towards the back.

I claim:

1. A conical tap, comprising:
   a front end piece provided with one of a chamfer and a chasing; and
   a conical threaded portion following the front end piece and having thread teeth located in a conical region, which teeth are provided with a relief arranged at a clearance angle, the clearance of the thread teeth located in the threaded portion being constant or increasing rearwardly.

2. A tap according to claim 1, wherein the constancy or the increase of the relief clearance angle extends across the entire length of the conical region.

* * * * *